United States Patent
Elonen et al.

(10) Patent No.: US 7,188,178 B2
(45) Date of Patent: Mar. 6, 2007

(54) DATA TRANSFER METHOD, SYSTEM AND COMPUTER PROGRAM PRODUCT

(75) Inventors: Pertti Elonen, Espoo (FI); Iiro Pietilä, Espoo (FI)

(73) Assignee: Contastic Oy, Espoo (FI)

( * ) Notice: Subject to any disclaimer, the term of this patent is extended or adjusted under 35 U.S.C. 154(b) by 731 days.

(21) Appl. No.: 10/029,914

(22) Filed: Dec. 31, 2001

(65) Prior Publication Data
US 2002/0184371 A1 Dec. 5, 2002

(30) Foreign Application Priority Data
Mar. 20, 2001 (FI) .................................. 20010566

(51) Int. Cl.
*G06F 15/16* (2006.01)
(52) U.S. Cl. ...................... 709/227; 709/203
(58) Field of Classification Search ................ 709/203, 709/219, 227
See application file for complete search history.

(56) References Cited

U.S. PATENT DOCUMENTS

| | | | | |
|---|---|---|---|---|
| 5,740,549 | A * | 4/1998 | Reilly et al. ................... 705/14 |
| 5,959,621 | A * | 9/1999 | Nawaz et al. ................. 715/733 |
| 6,035,423 | A * | 3/2000 | Hodges et al. ................. 714/38 |
| 6,710,702 | B1 * | 3/2004 | Averbuch et al. ............ 340/7.1 |
| 6,785,708 | B1 * | 8/2004 | Busey et al. ................ 709/204 |
| 6,892,240 | B1 * | 5/2005 | Nakajima .................... 709/227 |
| 2002/0065921 | A1 * | 5/2002 | Davidson et al. ........... 709/227 |
| 2003/0154244 | A1 * | 8/2003 | Zellers et al. ................ 709/203 |

OTHER PUBLICATIONS

Gerwig, Kate; "The push technology rage . . . so what's next?"; Aug. 1997; netWorker; vol. 1 Issue 2.*
Hauswirth, Manfred; Jazayeri, Mehdi; "A component and communication model for push systems"; Oct. 1999; Proceedings of the 7th European software engineering conference held jointy with the 7th ACM SIGSOFT internationational symposium.*
Hall, Eric; "Internet Core Protocols: The Definitive Guide"; Feb. 2000; O'Reilly.*
Kennedy, Bill; Musciano, Chuck; "HTML & XHTML: The Definitive Guid, 4th Edition"; Aug. 2000; O'Reilly.*
Eckstein, Robert; "XML Pocket Reference"; Oct. 1999; O'Reilly.*
Wong, Clinton; "HTTP Pocket Reference"; May 2000; O'Reilly.*

* cited by examiner

*Primary Examiner*—William Vaughn
*Assistant Examiner*—Greg Bengzon
(74) *Attorney, Agent, or Firm*—Young & Thompson

(57) ABSTRACT

Transferring data to a client, typically to a browser, using a certain packet data connection comprises the step of receiving (201) a request (305), which is according to a certain data transfer protocol and specifies a certain information entity (I) and the steps of sending (202), using said packet data connection, a first portion and further portions of a response according to said data transfer protocol. At a first time instant a first portion ($R_1$, 306) is sent (202), and said client after the receipt of said first portion is arranged to accept further at least a second portion of a response. At sequential second time instants a plurality of second portions ($R_{2,i}$, 307, 308, 310), each of said second portions comprising an information fragment of said information entity and computer language instructions for processing said information fragment, is sent (204, 209). A system and computer program product for transferring data are also described.

28 Claims, 7 Drawing Sheets

DATA TRANSFER METHOD, SYSTEM AND COMPUTER PROGRAM PRODUCT

BACKGROUND OF THE INVENTION

The invention relates in general to transmitting data in a packet data network. In particular the invention relates to transmitting data, which may be updated, from a server to a client.

DESCRIPTION OF THE RELATED ART

Term client refers in the specification and in the appended claims to a device or application (program) connecting to a server via a data network and typically requesting the server to send certain information. Term server refers to a device or application, which waits for connection requests from clients and responses to the requests by sending requested information. Term real-time service refers to services, where information residing in a server is updated every now and then and the updated information is delivered to a client. The server and client are connected to each other typically via a packet data network, for example via the Internet. Information is typically transferred from a server to a client using Hypertext Transfer Protocol (HTTP), and the client is typically a browser. Term real-time information refers to information, which resides in a server and is updated every now and then.

Real-time services become more and more widespread, and examples of such services are news and stock market information. There are two basic alternatives of keeping a client informed about the changes (or updates) in the information. The first alternative is client-initiated: the client is arranged to request the information repeatedly. As the client has no way of knowing, when information is updated in the server, it may request unchanged information to be transmitted. This causes unnecessary transfer of information. Furthermore, updated information is typically not delivered to a client (and to a user) promptly after the update.

The second alternative is server-initiated. A client requests for a piece of information once, and thereafter information update on the server triggers the server to push the updated information to a client. This alternative typically requires at the client side separate program modules. These alternatives are discussed in more detail below, but already this brief introduction discovers that there are problems in implementing real-time services.

A common protocol for transmitting data in packet data networks and especially in IP (Internet Protocol) networks is HTTP. HTTP uses Transfer Control Protocol (TCP), which provides reliable data transfer using acknowledgments of received data packets and, when needed, retransmission of data packets. For transmitting information using HTTP between a server and a client, a TCP connection is typically formed. HTTP messages are then transmitted using the established TCP connection.

A HTTP connection consists basically of a HTTP request and a HTTP response. A client sends a HTTP request indicating typically a certain URL (Universal Resource Locator), and the server responds by sending data relating to the URL in a HTTP response. Thereafter the client, especially when it is a browser, presents the received data to a user.

An example of the first alternative for providing real-time service to a user is presented in FIG. 1. In this example, HTTP protocol is used to transmit real-time information from server 100 to a client 110. The client 110 is a browser in a computer. A TCP connection is typically opened between the server 100 and the client 110, so that HTTP messages can be transmitted between them. In FIG. 1 it is shown, how the client 110 repeatedly sends HTTP request to the server 100. These HTTP requests 120a, 120b, 120c are typically identical. The server 100 responses to these HTTP requests 120a, 12b, 12c with HTTP responses 130, 131, 132. Each HTTP request - HTTP response pair forms a HTTP connection 140a, 140b, 140c. The contents of these HTTP responses depend on the real-time information residing on the server. If the real-time information has not been updated since the receipt of a previous HTTP request (for example 120b) from the client 110, at least two sequential HTTP responses (for example 131 and 132) are typically identical. All the HTTP requests and responses presented in FIG. 1 may be transmitted using one TCP connection, in other words the HTTP connections 140a, 140b and 140c may use one TCP connection. A browser typically refreshes the whole WWW-page, for example, when it receives a HTTP response 130, 131, 132.

Main advantage of the client-initiated real-time service is that it uses common techniques. The HTTP connections 140a, 140b, 140c are supported by all browsers; they are readily arranged to use TCP functionality typically provided by operation systems of computers. Client initiated real-time services are thus supported by any browsers. The main disadvantage of this approach is that the client does not automatically receive updated information. The HTTP request 120a, 120b, 120c need to be sent often in order to have updated information at the client within a reasonable delay, and this typically causes much un-updated information to be transferred in vain.

An example of the second alternative of providing real-time services by pushing updated information is the use of streaming technique. In streaming technique, only one request to begin information transfer is sent from a client to a server. As a response to this request, the server sends to the client information updates for a certain period of time. The length of this period may be predetermined, or it may be determined to last as long as a TCP connection, for example, relating to this real-time service is open between the client and the server. Using the TCP connection, the server may send updated information to the client. The main disadvantage of this approach is that there usually has to be a separate program module, which can establish a TCP connection and transfer information using TCP. Typically this is done using sockets, which are provided by an operating system.

SUMMARY OF THE INVENTION

An object of the invention is to present a flexible data transfer method, and a corresponding system and computer program product. A further object of the invention is to present a data transfer method enabling real-time services, which use server-initiated information updates, using standard browsers and standard data transfer protocols.

These and other objects of the invention are achieved by sending to a client, in response to a request for sending certain information entity, a first response portion, said first response portion allowing the client to accept further response portions.

A method according to the invention is a method for transferring data to a client using a certain packet data connection, said method comprising the step of:

receiving a request, which is according to a certain data transfer protocol and specifies a certain information entity, and being characterized in that it further comprises the steps of:

sending, using said packet data connection, at a first time instant to said client a first portion of a response according to said data transfer protocol, said client after receipt of said first portion being arranged to accept further at least a second portion of a response, and sending, using said packet data connection, at sequential second time instants to said client a plurality of second portions of a response, each of said second portions comprising an information fragment of said information entity and computer language instructions for processing said information fragment.

A system according to the invention is a system for transferring data using packet data connections, said system comprising means for establishing packet data connections, and means for receiving requests, a request indicating an information entity, being according to a data transfer protocol and relating to a certain packet data connection, and said system being characterized in that it further comprises means for sending as response to a request, using a request-specific packet data connection and at a request-specific first time instant, a first portions of a response according to said data transfer protocol, a receiver after receipt of said first portion being arranged to accept further at least a second portion of a response, and means for sending as a response to a request, using said request-specific packet data connection at sequential request-specific second time instants, a plurality of second portions of a response, each of said second portions comprising an information fragment of said information entity and computer language instructions for processing said information fragment.

Computer program product according to the invention is a computer program product for a system for transferring data using packet data connections and it is characterized in that it comprises computer code means for sending as response to a request, using a request-specific packet data connection and at a request-specific first time instant, a first portions of a response according to a data transfer protocol, a receiver after receipt of said first portion being arranged to accept further at least a second portion of a response, and computer code means for sending as a response to a request, using said request-specific packet data connection at sequential request-specific second time instants, a plurality of second portions of a response, each of said second portions comprising an information fragment of said information entity and computer language instructions for processing said information fragment.

In a method according to the invention, the first response portion sent from a server to a client causes a client to accept, and typically to wait for, further response portions. This enables a server to send, for example after the information entity the client requested is updated in the server, the updated information entity or, typically, an updated part of the information entity to the client. As the client waits for further response portions, it accepts the response portion carrying updated information. The invention is advantageously used for transferring updated information, but its use is not restricted to this specific case. It is alternatively possible, using a method according to the invention, to send any information entity piece by piece to a client, instead of sending the whole information entity using a single response message. The time periods between sending to sequential further response portions need not be equal, they may have various values.

The second response portions each comprise typically a computer language header, an information fragment of said information entity and computer language instructions for processing said information fragment in the client program. The computer language may be, for example, such a scripting language which typical client software, for example browsers, support. A scripting language is a simple programming language for writing scripts. A script is a list of commands that can be executed by a computer without user interaction. The computer language instructions may be a script. Alternatively, the computer language may be a language, which is used to provide structure to information by defining certain information elements and their values. Extensible Markup Language (XML) is an example of such a computer language. In this case, the computer language instructions are typically some well-defined tags, using which a certain value is declared for a certain information element.

In some cases a client program may determine to close a packet data connection or may determine that there is no further data to be received, if no data is transmitted for a certain period of time. The latter case is true for some browsers. Therefore, in a method according to the invention, the time period between two sequential response portions is advantageously limited to a certain maximum value. This way, for example, a client, which is a browser, does not close a HTTP connection or a TCP connection relating to the transfer of the requested information entity.

Advantageously, only an updated part of the information entity is transferred to the client. This can be done, for example, by defining using a computer language that the information entity is formed of various information elements. A response portion sent after information update may in this case identify an information element and state a new value for said information element. In practice, there are various scripting languages to be used with browsers that support this functionality. Examples of such are Dynamic HTML, VBScript, JScript and JavaScript.

One advantage of the invention is that when suitable scripting languages are used, it does not require any additional software (such as Java Applets) or any modification to, for example, existing browsers in the clients. Client communicating using certain standard data transfer protocols may readily use a method according to the invention. For example, when the standard data transfer protocol used is HTTP, typically any browser is able to receive real-time information in accordance with the invention, when the second response portions comprise a suitable scripting language. When the client software is a browser, the invention does not require in a client device support, for example, for executing Java Applets or other software components, which are sometimes used to enhance the functionality of a browser. Alternatively, if desired, it is straightforward to program specific client programs, which display or process information delivered using a method according to the invention.

A further advantage of the invention is that, as standard data transfer protocols are enough to implement a data transfer method according to the invention, there is no need to make specific adjustments to, for example, firewalls or networks, via which the data transfer connections pass. The response portions are, for example, plain TCP packets carrying textual HTML information or carrying some simple computer language commands or tags in HTML format. A firewall typically allows this kind of messages to pass. With prior art solutions, where server-initiated push methods are used, the data to be transferred typically contains some active components to be executed in the client. ActiveX components or Java Applets are examples of such active components. It is difficult to ensure, for example, in a firewall that such active components do not pose a security risk in a local network, and therefore data packets carrying such component may be discarded in a firewall.

BRIEF DESCRIPTION OF THE DRAWINGS

The invention is now described in more detail with reference to the accompanying drawing, where.

DESCRIPTION OF THE PREFERRED EMBODIMENTS

Figure 1:
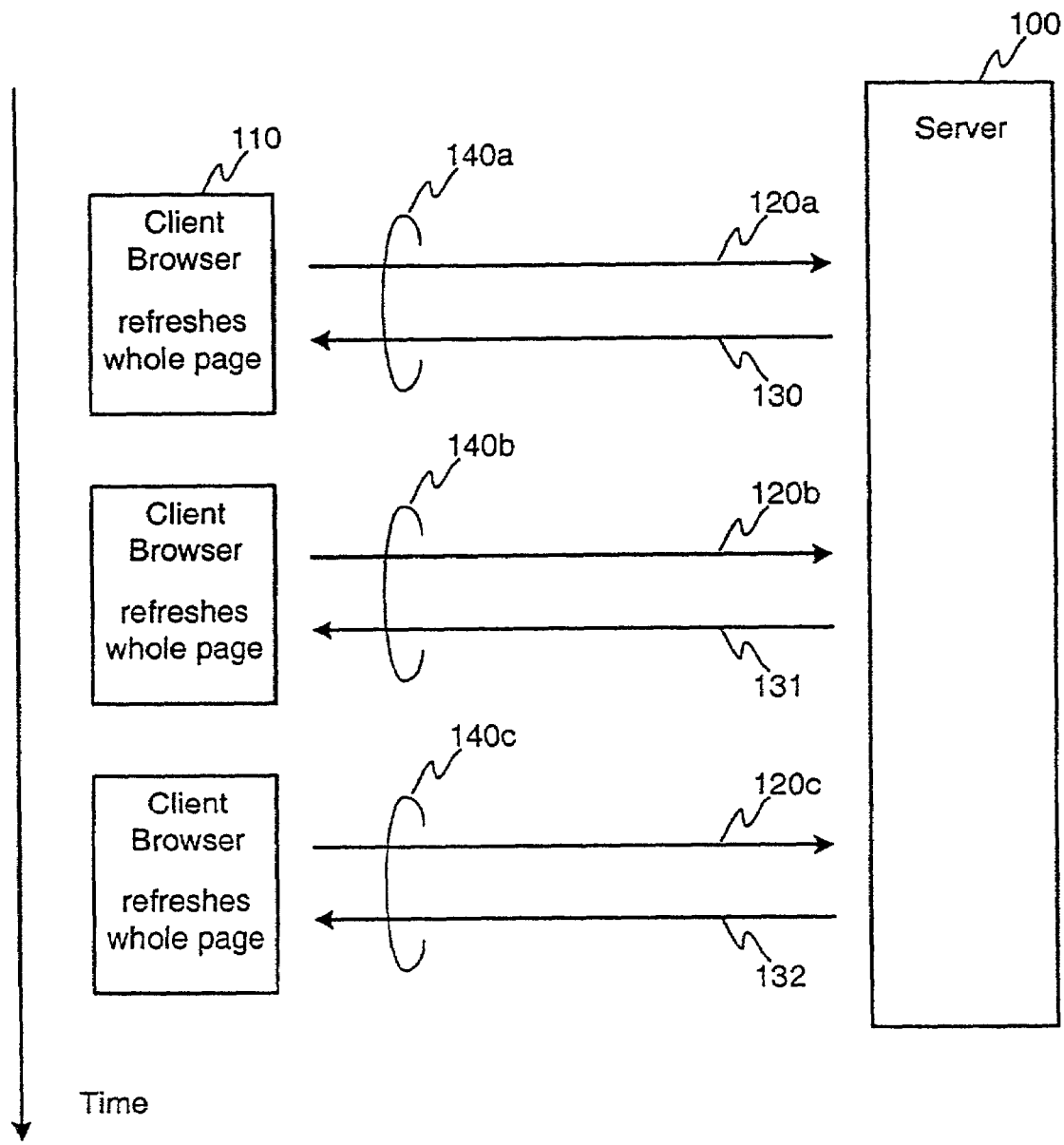
FIG. 1 illustrates an example of a client-initiated real-time service according to prior art.

FIG. 1 is discussed above in conjunction with reference to prior art solutions.

Figure 2:
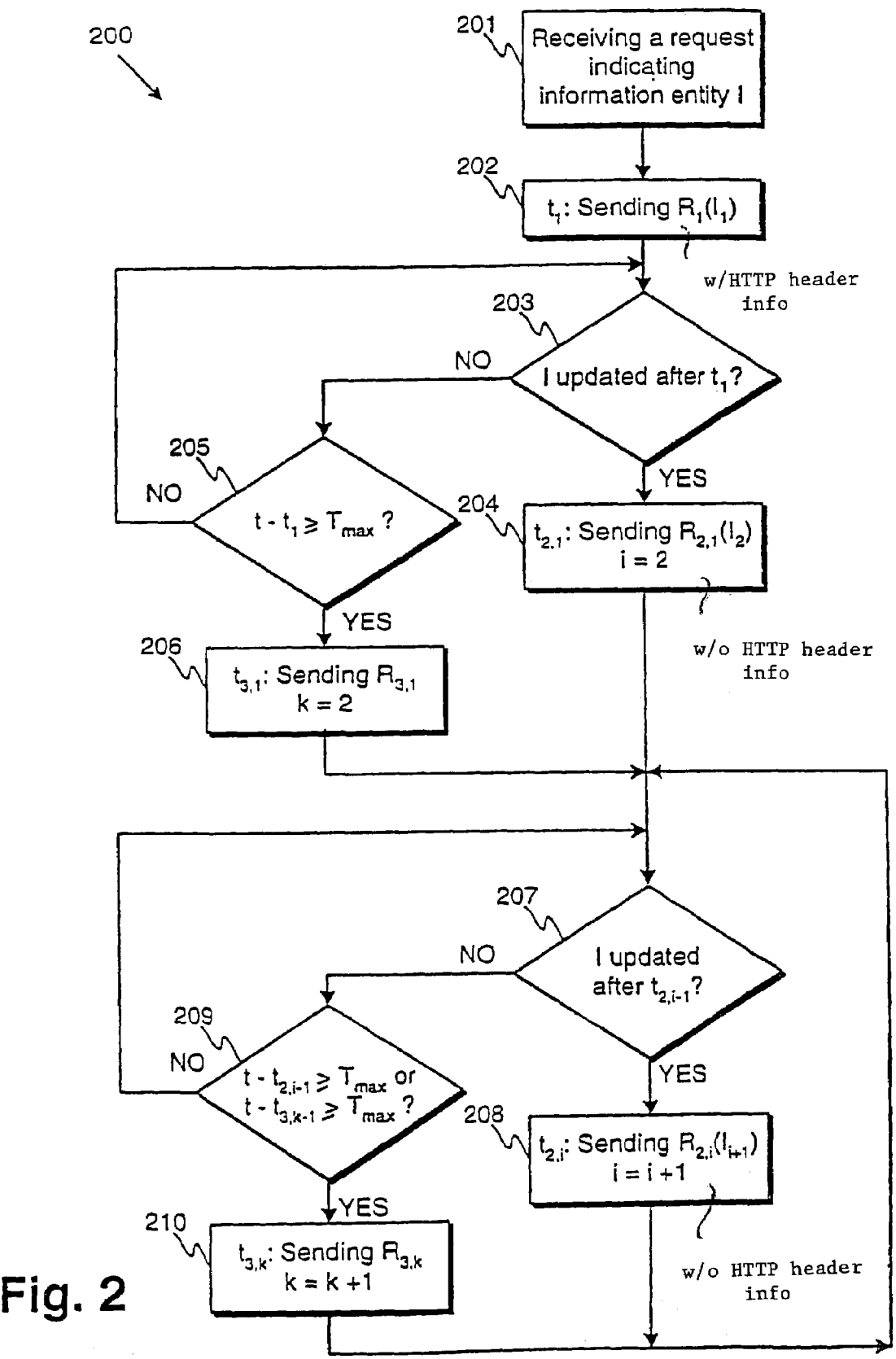
FIG. 2 illustrates as an example a flowchart of a method according to a first preferred embodiment of the invention.

FIG. 2 illustrates as an example a flowchart of a method 200 for transferring information according to a first preferred embodiment of the invention. In step 201 a request, which is according to a certain data transfer protocol and specifies a certain information entity I, is received. In step 202, at a first time instant $t_1$ a first response portion $R_1$, typically comprising a first information fragment $I_1$ relating to said information entity I is sent to said client. This first response portion $R_1$ is such that it causes the client to expect at least a second response portion. Such a second response portion typically contains second information fragment $I_2$ relating to said information entity I. Examples of such response portions $R_1$ are described in more detail below in connection with other preferred embodiments of the invention.

After sending the first response portion $R_1(I_1)$ it is checked in step 203, whether the information entity I residing typically at the server is updated. If the information entity has been updated after t1, a second response portion $R_{2,1}(I_2)$ is sent in step 204 at time instant $t_{2,1}$. This second response $R_{2,1}$ comprises an information fragment $I_2$ relating to the information entity I. This information fragment may be, for example, either the whole updated information entity I or the part of the information entity I that has been updated. The second response portion $R_{2,1}$ comprises also some computer language instructions for processing the information fragment $I_2$. It may further comprise computer language headers. A counter i is increased in step 204 for reasons of clarity. Such a counter is not necessarily used in a method according to the invention.

If the information entity I has not been updated after $t_1$, it is checked in step 205 whether time lapsed since $t_1$ is equal to or greater than a certain predetermined maximum time period $T_{max}$. A typical value for this maximum time period is 30–120 seconds, but it may range from about a second to a few minutes. If such a period of time has not yet lapsed, steps 203 and 205 are repeated until either of the checks is true. If such a period of time has already lapsed since $t_1$, when step 205 is performed, a third response portion $R_{3,1}$ is sent in step 206 at time instant $t_{3,1}$. As the information entity I has not been updated since $t_1$, it is not necessary to send any information fragments in this response portion. The purpose of sending this response portion $R_{3,1}$ is to ensure that a client stays ready to accept further second response portions $R_{2,i}$. A counter k is increased in step 206 for reasons of clarity. Such a counter is not necessarily used in a method according to the invention.

The second response portion $R_{2,1}$ is the earliest sent response of a plurality of second response portions $R_{2,i}$. The number of these second response portions $R_{2,i}$ depends typically on the duration of the information transfer. The information transfer may be stopped, for example, by a client closing a data transfer connection, for example a TCP connection, using which the response portions, for example, HTTP message portions, are delivered to the client.

After sending the earliest of the second response portions $R_{2,1}$ or the earliest of third response portions $R_{3,1}$ it is checked in step 207, whether the information entity I residing typically at the server is updated since $t_{2,i-1}$. If the information entity has been updated after $t_{2,i-1}$, a further second response portion $R_{2,i}(I_{j+1})$ is sent in step 208 at time instant $t_{2,i}$. The counter i is increased in the same step. The response portion $R_{2,i}$ comprises an information fragment $I_{j+1}$ relating to the information entity I. If the information entity I has not been updated after $t_{2,i-1}$, it is checked in step 209 whether time lapsed since $t_{2,i-1}$ or $t_{3,k-1}$ is equal to or greater than a certain predetermined maximum time period $T_{max}$. If such a period of time has not yet lapsed, steps 207 and 209 are repeated until either of the checks is true. If such a period of time has already lapsed since $t_{2,i-1}$ or $t_{3,k-1}$, when check in step 209 is performed, a further third response portion $R_{3,k}$ is sent in step 210. Similarly as in step 205 for the third response portion $R_{3,1}$, it is not necessary to send any information fragments in the response portion $R_{3,k}$ in step 210.

After step 208 or 210 the method 200 continues in step 207. The steps 207–210 are repeated as long as method 200 is carried out. Typically, the resulting sequence of messages contains second and third response portions interleaved with each other. It is possible that the resulting sequence of messages contains, after the first response portion, only second response portions; this is the case typically, when either the information entity I is updated frequently or when there is no need to transmit messages so that the time interval between two sequential response portions has at maximum a certain value. In the latter case typically no third response portions are sent. The time intervals checks in steps 205 and 209 may use different values for the maximum interval; FIG. 2 shows a same $T_{max}$ value in both steps 205 and 209 as an example.

The information fragment $I_1$ in the first response portion in step 202 may be the current information entity I or a part of the current information entity I. If $I_1$ is only part of the information entity I, it is possible that in some second response portions $R_{2,i}$ sent in steps 204 and 208 comprise further information fragments relating to the information entity I at time instant $t_1$ are transmitted. Alternatively, it is possible that the first response portion $R_1$ contains only, for example, an identifier indicating, for example, a name of the information entity I. Furthermore, $R_1$ need not contain any part of the actually requested information entity I; in this case $I_1$ refers to a non-existent information fragment or to an empty information fragment.

In the following, when further preferred embodiments of the invention are described, HTTP is used as an example of a standard data transfer protocol and a TCP connection is used as an example of a packet data connection. The ideas presented below are, however, not restricted to use of HTTP or TCP.

Table 1 illustrates examples of contents of TCP messages that may be sent in a method according to a second preferred embodiment of the invention. A HTTP request, which may be received, for example, in step 201, is presented firstly. A first response portion $R_1$, which may be the beginning of a HTTP response message, is presented in the next row of Table 1. Alternatives for a second response portions $R_{2,i}$ and alternatives for a third response portions $R_{3,k}$ are illustrated also in Table 1.

The first response portion $R_1$ illustrated in Table 1 is a beginning of a HTTP response, but it does not contain a Content-Length parameter. This Content-Length parameter typically indicates the length of the information entity the server sends to a client, in one or more HTTP responses. A browser typically ignores any messages relating to a certain HTTP request after it has received an amount of information corresponding to a Content-Length parameter specified in the beginning of a HTTP response. Advantageously the Content-Length parameter is not present in a HTTP first response portion $R_1$. Alternatively it is possible to have the Content-Length parameter in a HTTP first response portion (or a corresponding parameter in the first portion of another data transfer protocol response) and to select such a large value for this Content-Length parameter that the amount of data relating to the plurality of second response portions (and possible third response portions) of this connection is not expected to exceed the selected value. If a value for a Content-Length parameter or for a corresponding parameter is given in a first portion of a response in a method according to the invention, its value exceeds the amount of data relating to this first portion of a response. An example of a value for the Content-Length parameter in a HTTP $R_1$ is 10000000. This means that a client (browser) expects the HTTP response to contain 10000000 bytes.

The question marks and ellipsis points between the HTML script tags <script> and </script> in the content of response portion $R_{2,i}$ indicate some scripting language specific instructions. Example of JavaScript is given below.

Table 2 illustrates examples of contents of TCP messages that may be sent in a method according to a third preferred embodiment of the invention. In this third preferred embodiment, frames, which are elements of HTML pages, are used. A HTML page, which is here given as an example, has a first frame, whose name is feedsource and which receives messages sent using a method in accordance with the invention. The HTML page has a second frame, whose name is feedtarget and which relates to showing the received, in this example periodically updated information to a user.

Figure 3:
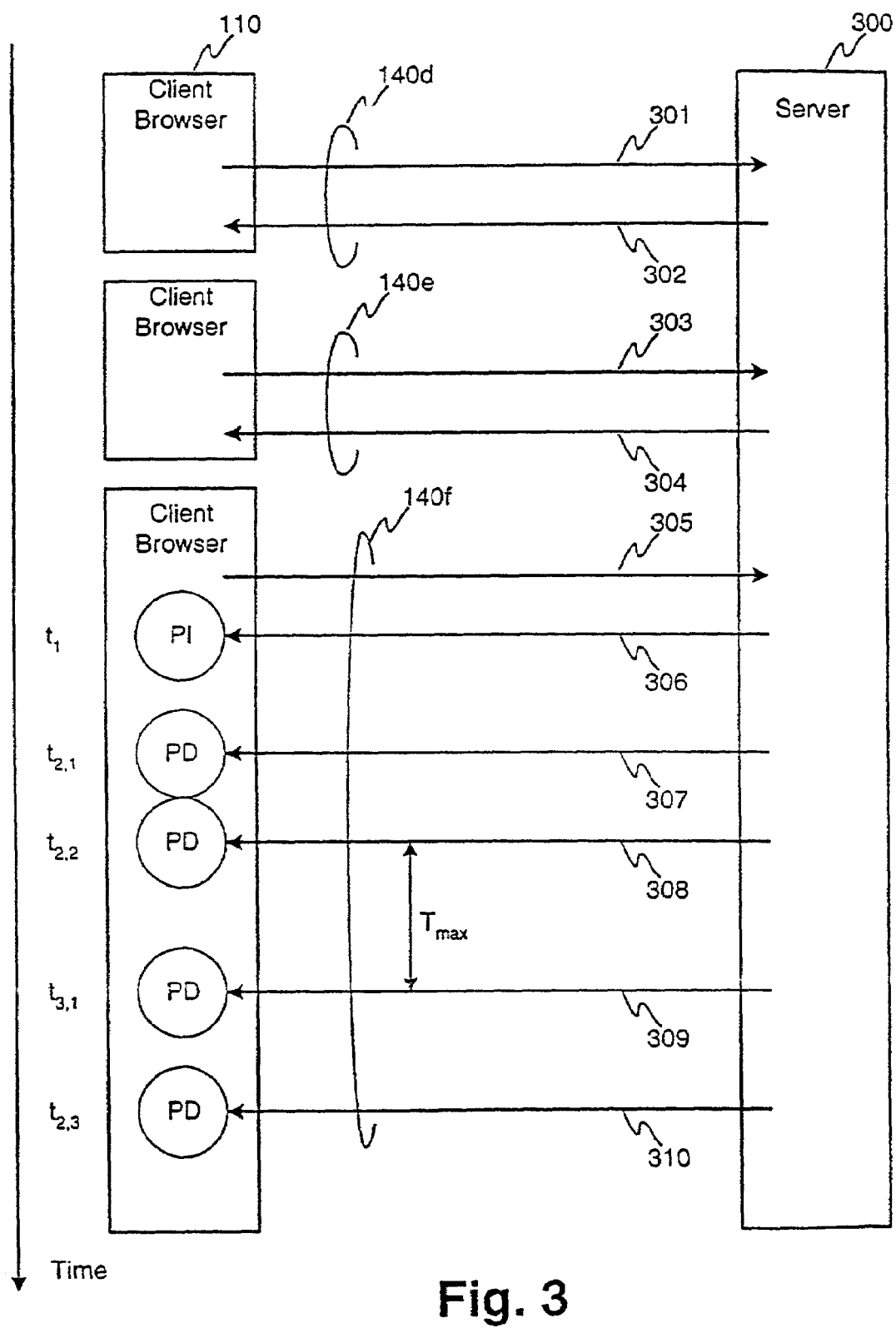
FIG. 3 illustrates as an example a message sequence relating to a method according to a second preferred embodiment of the invention.

FIG. 3 illustrates as an example a message sequence between a client 110, which is a browser, and a server 300; this message sequence relates to the third preferred embodiment of the invention. Messages presented in FIG. 3 are HTTP messages or portions of HTTP messages, examples of which are presented in Table 2 and which are transferred typically using a single TCP connection.

The first initiating request 301 is a HTTP request specifying a HTML document feedframe.htm. This HTML document is delivered to a client in the first initiating response 302, which is a HTTP response indicating two frames (feedsource, feed-target) and sources (/feed.rtscript and /feedtarget.htm), where content for these frames can be fetched. After receiving the HTTP response 302 the client sends a second initiating request 303, which is a HTTP request specifying HTML document feedtarget.htm. As a response to the message 303, the server sends a second initiating response 304, which is a HTTP response specifying name t1 for a field of type text in a form, whose name is f1. As can be seen in Table 2, the HTTP responses 302 and 304 contain the Content-Length parameter and a value for this parameter. FIG. 3 illustrates, how the message pairs 301, 302 and 303, 304 form two HTTP connections 140d, 140e.

The request 305, which is a HTTP request specifying source feed.rtscript, starts a message sequence in accordance with the invention. As a response to this request 305, the server first sends a first response portion 306. This first response portion 306 is a beginning of a HTTP response message. It declares, with the <HMTL> tag, that an HTML document is being transmitted. The body of the HTML document is empty, and between the script tags value 0 is defined for the field t1 in form f1 in a frame [1] (which relates to the feedtarget.htm) in a parent window. The second response portion $R_{2,1}$ 307 defines value 1 for the same input parameter, and the second response portion $R_{2,2}$ 308 defines value 2 for the input parameter. No further response portions are illustrated in Table 2, but FIG. 3 illustrates a third response portion $R_{3,1}$ 309, which is typically similar to one of the alternative presented in Table 1 for third response portion $R_{3,i}$. After this third response portion, a further second response portion $R_{2,3}$ 310 is sent to the client. It is possible that sequential third response portions are sent to a client (as is evident, for example, from FIG. 2), although this is not illustrated in FIG. 3.

FIG. 3 illustrates also, how the message pairs 305, 306, 307, 308 and 309, 310 form one HTTP connection 140f.

In a fourth preferred embodiment of the invention, the computer language is XML. Typically, at the time of writing this patent application, a browser needs an ActiveX-component or a Java-Applet for processing XML information. It is, however, possible that future browsers themselves are able to process XML without any additional component. Table 3 illustrates examples of HTTP messages containing XML. In this example the values of fields t1 and t2 in an XML document are updated by sending second responses $R_{2,i}$. In Table 3, the first response contains only HTTP headers, and the second responses comprise XML elements.

Table 4 illustrates examples of messages, when the first response portion $R_1$ indicates that an XML document is being transferred. Here the first response portion contains HTTP response header information and starting headers of an XML document. The second response portions comprise XML elements.

Figure 4:
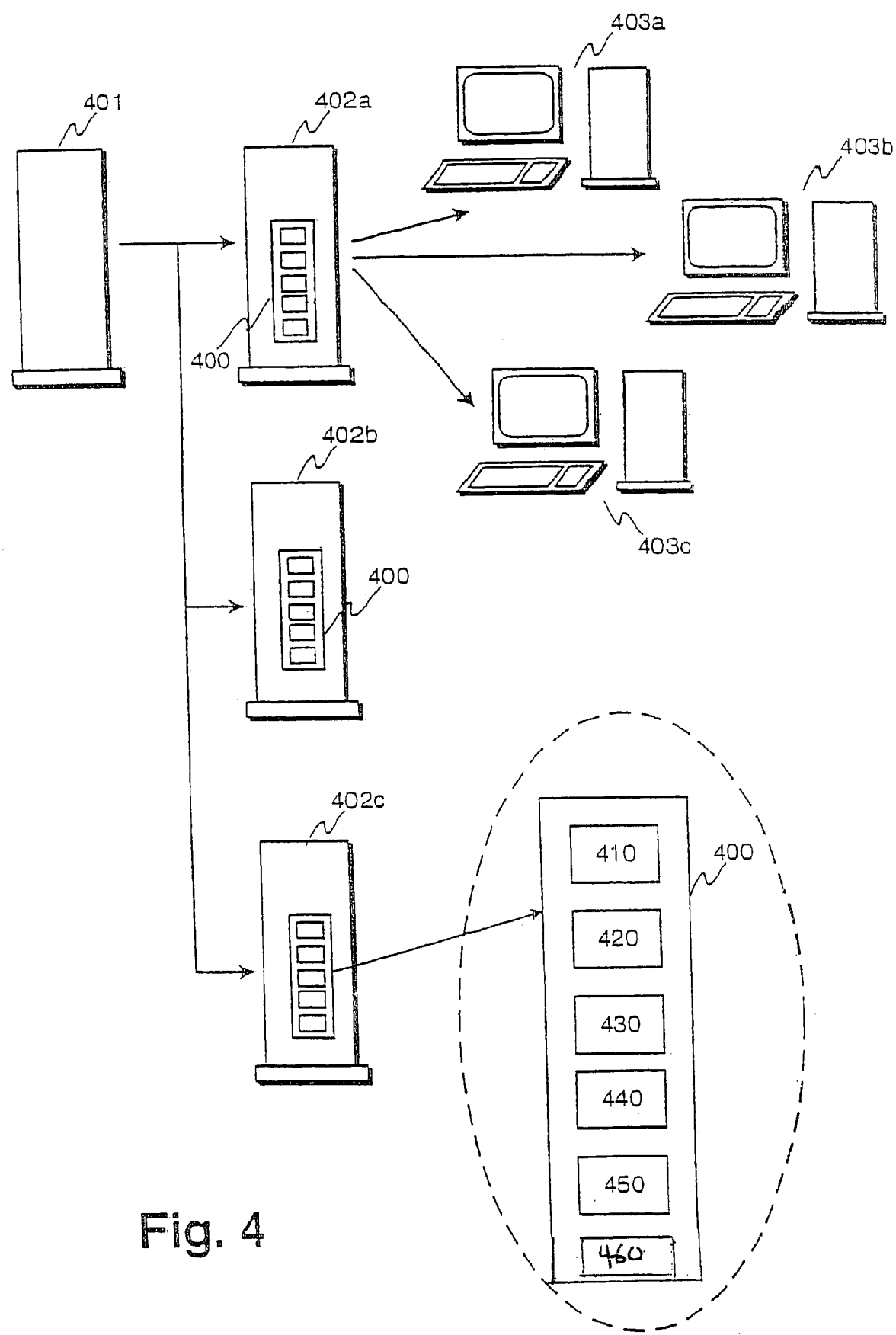
FIG. 4 illustrates schematically an example of a system according to the invention and its use.

FIG. 4 illustrates, as an example, schematically a system 400 according to the invention. The system 400 comprises
  means 410 for establishing packet data connections, and
  means 420 for receiving requests, a request indicating an
    information entity, being according to a data transfer
    protocol and relating to a certain packet data connection, and it is characterized in that it further comprises
  means 430 for sending as response to a request, using a
    request-specific packet data connection and at a
    request-specific first time instant, a first portions of a
    response according to said data transfer protocol, said
    client after receipt of said first portion accepting further
    at least a second portion of a response, and
  means 440 for sending as a response to a request, using
    said request-specific packet data connection at sequential request-specific second time instants, a plurality of
    second portions of a response, each of said second
    portions comprising an information fragment of said information entity and computer language instructions for processing said information fragment.

System 400 may further comprise means 450 for sending as a response to a request, using said request-specific packet data connection, at sequential request-specific third time instants a plurality of third portions of a response, said third portions containing no information fragments of said information entity. Furthermore, system 400 may further comprise means 460 for receiving updated information, for example, for an information server 401. As illustrated in FIG. 4, an information server 401 may be connected to a plurality of data transfer servers 402*a*, 402*b*, 402*c* according to the invention, in each of which a system 400 is implemented. As FIG. 4 illustrates, each of the data transfer servers 402 typically transmits data to a plurality of clients 403.

The system 400 is typically implemented as a combination of software and hardware: it typically is a computer program or a set of computer programs to be executed using suitable microprocessor(s) and memory means. For actual data transfer between a server and a local network, to which a server is typically connected, any network interface may be used.

Figure 5A:
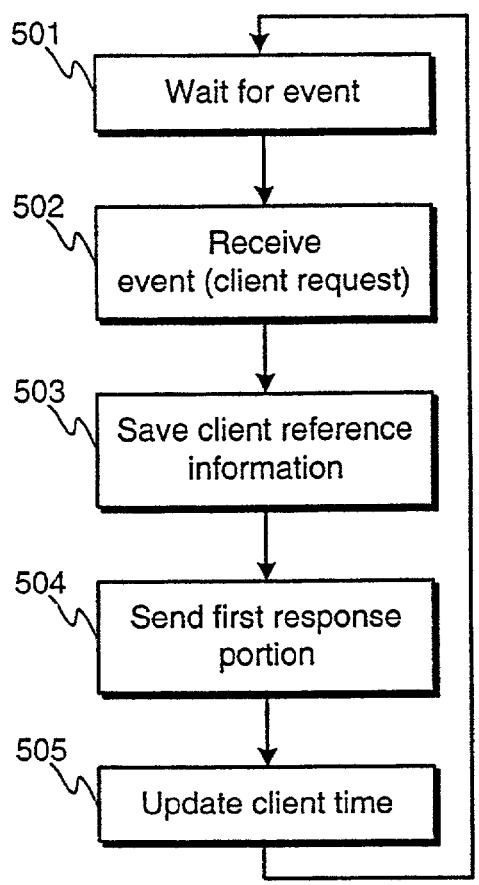
FIGS. 5a–5e illustrate flowchart of methods, which may be used in a system according to the invention.

FIG. 5*a* illustrates an example, how means 420 for receiving a request and means 430 for sending a first response portion may be arranged to operate. When system 400 is idle, it may be waiting for events (step 501). When a request from a client is received using, for example, a TCP stack, at some point of the processing of the TCP message containing the request, a client-request event is created. This event is received in step 502. Thereafter client reference information (for example, TCP socket for the client connection) is saved typically to a list containing information about clients in step 503. In step 504, a first response portion $R_1$ is sent to the new client. In step 505 information about the client-specific time, when a response portion was most recently sent to a specific client, is updated. This information may be stored in the list containing information about clients.

Figure 5B:
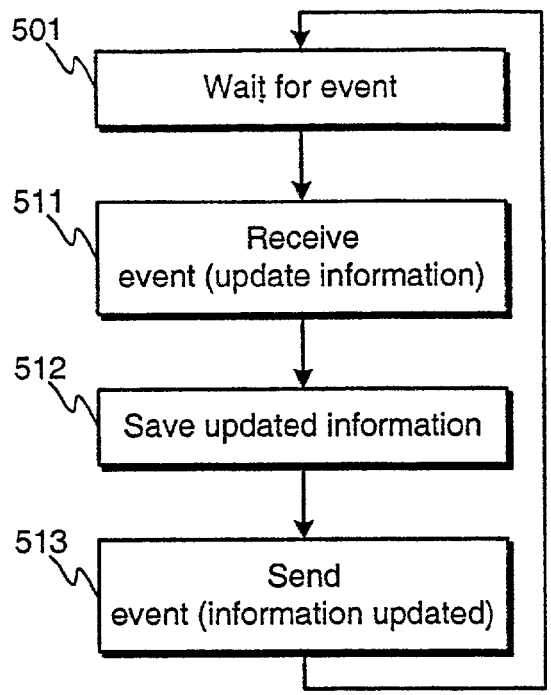

FIG. 5*b* illustrates an example, how means 460 for receiving updated information may operate. Updated information is received in step 511, it is saved typically in memory means in a server 403 in step 512, and thereafter an event indicating to other parts of the system 400 that updated information has been received is generated in step 513.

Figure 5C:
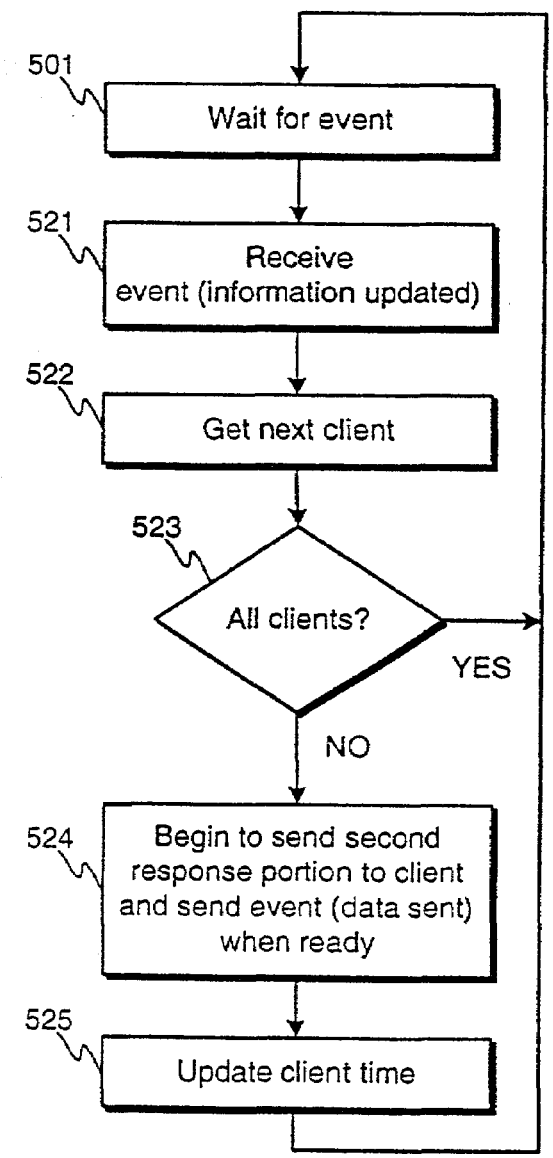

FIG. 5*c* illustrates an example, how means 440 for sending second response portions may be arranged to operate, when updated information is sent in the second response portions. In step 521 an event is received, which indicates that updated information is received. In steps 522 and 523 the list containing information about clients is processed. For each client, updated information is sent in a second response portion (step 524). After the sending is begun, the client time information is updated (step 525). After the second response portion has been sent, an event is generated, which indicates that update data has been sent to a specific client.

Figure 5D:
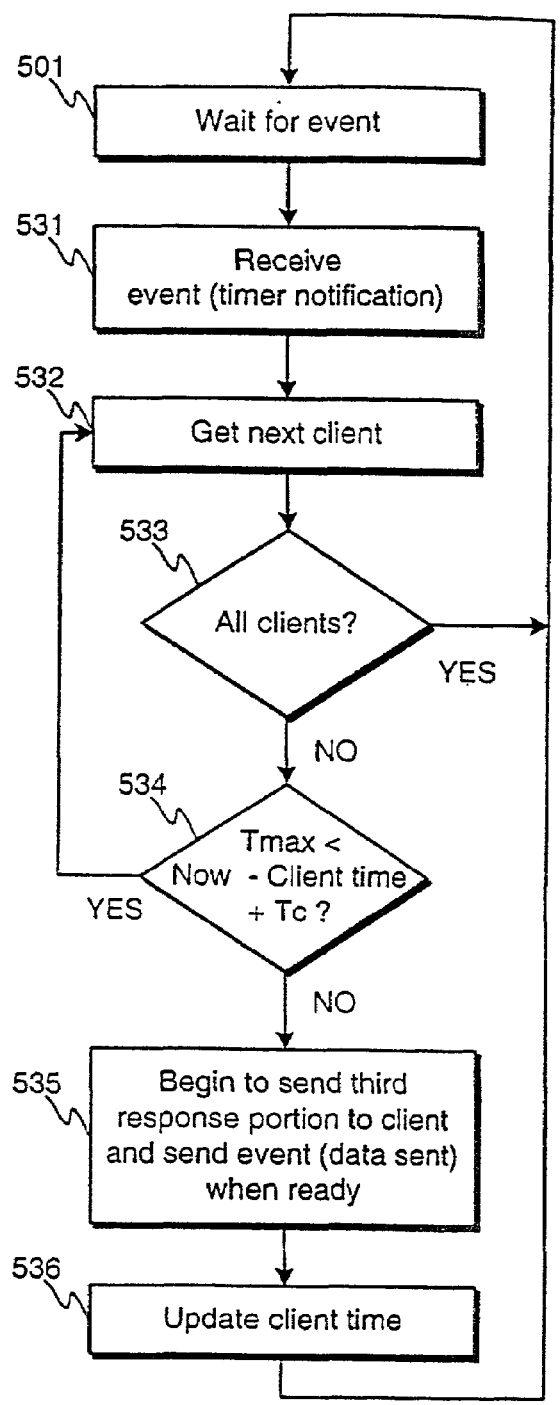

FIG. 5*d* illustrates an example, how means 450 for sending third response portions may operate. In step 531 a timer notification event is received. This notification is a notification relating to a timer Tc, which is common to all existing data transfer connections to clients. Client-specific timers are an alternative, but they typically require more computing resources than the use of a common timer. When a common timer is used, the client list is processed (steps 532 and 533) after receipt of said time notification. If the time period from the most recent time instance, when to a specific client a response portion was sent, to the time instant, when the common timer Tc next notifies, is less than a predetermined limit $T_{max}$ (step 534), the next client in the client list is processed. This means that when this client is checked after the next Tc notification, there most probably is still time to send a third response portion. Alternatively, a third response portion is sent to the client in steps 535 and 536 similarly as a second response portion is sent in steps 524 and 525. To ensure that the time period between two sequential response portions sent to a specific client does not exceed $T_{max}$, the time period Tc relating to the common timer should be clearly smaller than $T_{max}$.

Figure 5E:
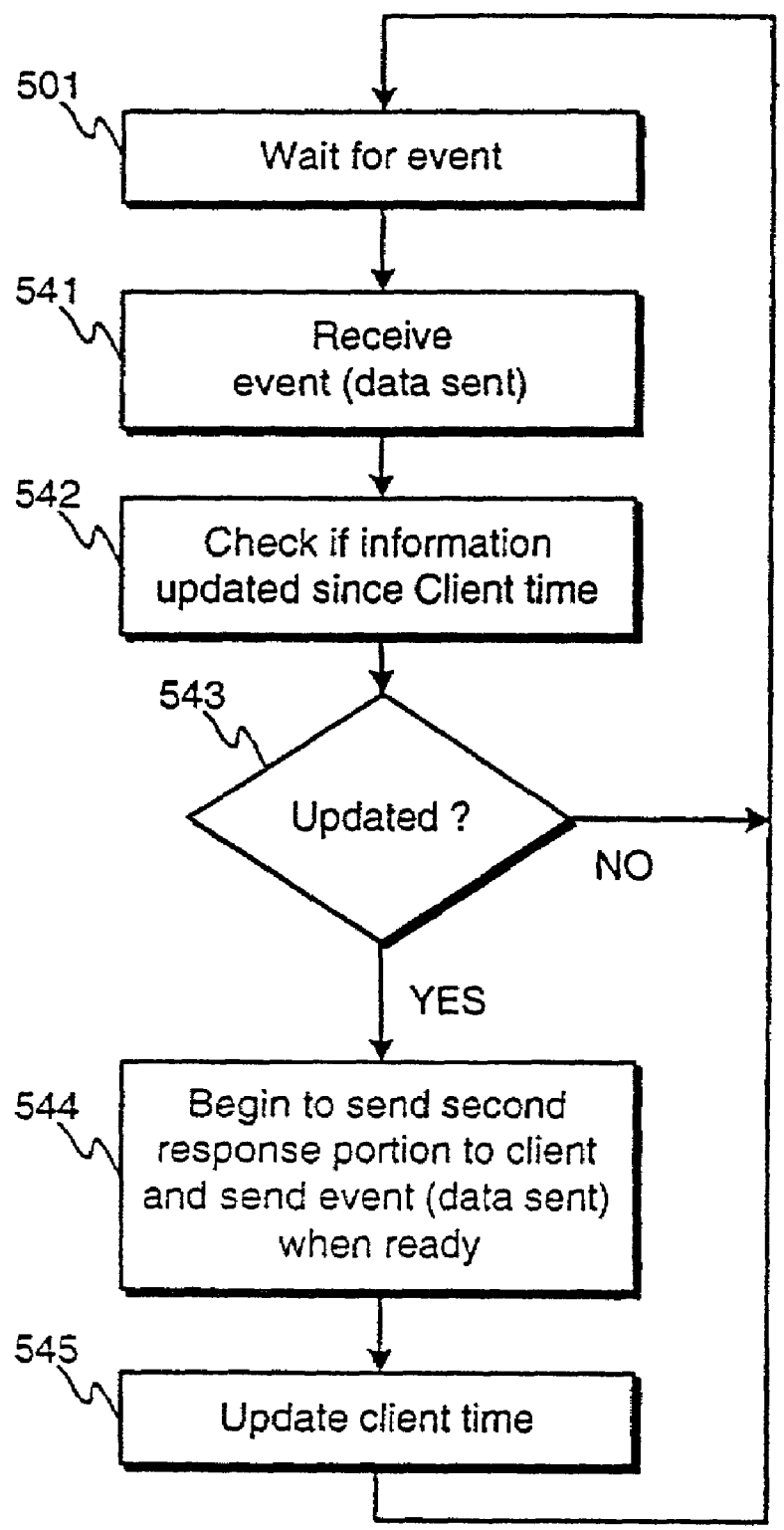

FIG. 5*e* continues to illustrate the examples in FIGS. 5*c* and 5*d*. It is possible that new updated information is received, while the client list is processed in steps 524–525 or 535–536. The flowchart illustrated in FIG. 5*e* is client-specific, as the data sent event relates to a certain client. When the data sent event is received in step 541, it is checked in step 542 if information has been updated since client time (i.e. since very recently, as the client time has been updated in step 525 or in step 536). If information has been updated, then in steps 544 and 545, which are identical to steps 524 and 525, the updated information is sent to this client in a second response portion.

Above, HTTP is used many times as an example of a standard data transfer protocol and a TCP connection is used many times as an example of a packet data connection. The ideas presented below are, however, not restricted to use of HTTP or TCP. They apply to a data transfer method or protocol similar to HTTP, where a request received typically by a server causes a response to be sent to a browser, and in the response there may be, but there does not have to be, a parameter indicating the amount of data in the response. Similarly, the packet data connection may be any packet data connection.

In view of the foregoing description it will be evident to a person skilled in the art that various modifications may be made within the scope of the invention. While some preferred embodiments of the invention have been described in detail, it should be apparent that many modifications and variations thereto are possible, all of which fall within the true spirit and scope of the invention.

TABLE 1

Examples of message contents in a second preferred embodiment

| Message | Content |
|---|---|
| Request | GET /realtimeinfo HTTP/1.0\r\n |
| | Accept: */*\r\n |
| | Accept-Language: en\r\n |
| | User-Agent: RealTimeScriptingClient\r\n |
| | Connection: Keep-Alive\r\n |
| | \r\n |
| first response portion $R_1$ | HTTP/1.0 200 OK\r\n |
| | Server: RealTimeServer\r\n |
| | Content-Type: text/html\r\n |
| | \r\n |
| second response portion $R_{2,i}$ third response portion $R_{3,k}$ | <script>...???...</script>\r\n |
| | or |
| | <script language="some_script">...???...</script>\r\n |
| | \r\n |
| | or |
| | <script></script>\r\n |
| | or |
| | <script/>\r\n |

TABLE 2

Examples of messages in a third preferred embodiment

| Message | Content |
|---|---|
| A first initiating request 301 | GET /feedframe.htm HTTP/1.0\r\n<br>Accept: */*\r\n<br>Accept-Language: en\r\n<br>User-Agent: RealTimeScriptingClient\r\n<br>Connection: keep-alive\r\n<br>\r\n |
| A first initiating response 302 | HTTP/1.0 200 OK\r\n<br>Server: SomeServer\r\n<br>Content-Type: text/html\r\n<br>Connection: keep-alive\r\n<br>Content-Length: 140\r\n<br>\r\n<br><Html><br><Frameset rows="64, *"><br><Frame name="feedsource" src="/feed.rtscript"><br><Frame name="feedtarget" src="/feedtarget.htm"><br></Frameset><br></Html> |
| A second initiating request 303 | GET /feedtarget.htm HTTP/1.0\r\n<br>Accept: */*\r\n<br>Accept-Language: en\r\n<br>User-Agent: RealTimeScriptingClient\r\n<br>Connection: Keep-Alive\r\n<br>\r\n |
| A second initiating response 304 | HTTP/1.0 200 OK\r\n<br>Server: SomeServer\r\n<br>Content-Type: text/html\r\n<br>Connection: keep-alive\r\n<br>Content-Length: 87\r\n<br>\r\n<br><Html><Body><br><Form name="f1"><br><Input type="text" name="t1" value=""><br></Form><br></Body></Html> |
| Request 305 | GET /feed.rtscript HTTP/1.0\r\n<br>Accept: */*\r\n<br>Accept-Language: en\r\n<br>User-Agent: RealTimeScriptingClient\r\n<br>Connection: keep-alive\r\n<br>\r\n |
| Response portion $R_1(I_1)$ 306 | HTTP/1.0 200 OK\r\n<br>Server: RealTimeServer\r\n<br>Content-Type: text/html\r\n<br>\r\n<br><HTML><br><BODY><br></BODY><br><Script>window.parent.frames[1].document.f1.t1.value='0';<br></Script> |
| $R_{2,1}(I_2)$ 307 | <Script>window.parent.frames[1].document.f1.t1.value='1';<br></Script>\r\n |
| $R_{2,2}(I_3)$ 308 | <Script>window.parent.frames[1].document.f1.t1.value='2';<br></Script>\r\n |

TABLE 3

Examples of messages in a fourth preferred embodiment

| Message | Content |
|---|---|
| Request | GET /xmlfeed.rtscript HTTP/1.0\r\n<br>Accept: */*\r\n<br>Accept-Language: en\r\n<br>User-Agent: RealTimeScriptingClient\r\n<br>Connection: Keep-Alive\r\n<br>\r\n |
| $R_1$ | HTTP/1.0 200 OK\r\n<br>Server: RealTimeServer\r\n<br>Content-Type: text/xml\r\n<br>\r\n |
| $R_{2,1}(I_2)$ | <cell><field>t1</field><value>234</value><cell>\r\n<br><cell ><field>t2</field><value>123</value><cell>\r\n |
| $R_{2,2}(I_3)$ | <cell><field>t1</field><value>237</value><cell>\r\n |
| $R_{3,1}$ | \r\n |
| $R_{2,3}(I_4)$ | <cell><field>t2</field><value>119</value><cell>\r\n |

TABLE 4

Second examples of messages in a fourth preferred embodiment

| Message | Content |
|---|---|
| Request | GET /xmlfeed.rtscript HTTP/1.0\r\n<br>Accept: */*\r\n<br>Accept-Language: en\r\n<br>User-Agent: RealTimeScriptingclient\r\n<br>Connection: Keep-Alive\r\n<br>\r\n |
| $R_1(I_1)$ | HTTP/1.0 200 OK\r\n<br>Server: RealTimeServer\r\n<br>Content-Type: text/xml\r\n<br>\r\n<br><?xml version="1.0"?><somexmldocument>\r\n |
| $R_{2,1}(I_2)$ | <cell><field>t1</field><value>234</value><cell>\r\n<br><cell><field>t2</field><value>123</value><cell>\r\n |
| $R_{2,2}(I_3)$ | <cell><field>t1</field><value>237</value><cell>\r\n |
| $R_{3,1}$ | \r\n |
| $R_{2,3}(I_4)$ | <cell><field>t2</field><value>119</value><cell>\r\n |

The invention claimed is:

1. Method for transferring data from a server to a client using a HTTP connection, said method comprising the steps of:
   1) sending only one HTTP request by a client to a server for a certain information entity in the server, where
   the one HTTP request is sent using HTTP data transfer protocol, the one HTTP request establishes a HTTP connection and the one HTTP request specifies the certain information entity in the server,
   after sending the one HTTP request to the server, the client does not send any further request to the server that specifies said certain information entity,
   said certain information entity being at least partly updated continuously after sending said one HTTP request,
   2) sending, using said HTTP connection, at a first time instant from the server to said client a first response portion comprising a first information fragment relating to said information entity according to said HTTP data transfer protocol,
   said first response portion further comprising all header information of the whole response encompassing said first response portion and subsequent second response portions, and a body of a web page showing said certain information entity, and
   said client after receipt of said first response portion being arranged to accept further at least one subsequent second response portion,
   3) sending, using said HTTP connection, at sequential second time instants from the server to said client a plurality of second response portions in response to said one HTTP request, each of said second portions comprising only an information fragment of an updated part of said information entity and a script for processing said information fragment of the updated part of said information entity, each second portion free of all HTTP header information, wherein
   the time period between the first time instant and the earliest second time instant is at maximum a certain first predetermined time period,
   a time period between two sequential second time instants is at maximum a certain second predetermined time period, and
   the HTTP data transfer protocol is situated in the application layer on the top of the OSI model, and
   4) sending, using said HTTP connection, at sequential third time instants from the server to said client a plurality of third response portions, said third portions containing no information fragments specific to said information entity, wherein at least one of said third portions contains only computer language instructions without the information fragment.

2. A method according to claim 1 wherein at least one of said third portions contains only one of i) carnage return characters, ii) linefeed characters, and iii) both carnage return and linefeed characters.

3. A method according to claim 1, wherein the time period between the first time instant and the earliest second time instant is at maximum a certain first predetermined time period, and a time period between two sequential time instants of the second and third time instants is at maximum a certain second predetermined time period.

4. A method according to claim I, wherein a packet data connection is a Transfer Control Protocol connection, the response, whereof said first portion constitutes a part, is a Hypertext Transfer Protocol Response and said first portion leaves Content-Length field value unknown.

5. A method according to claim 4, wherein said computer language is a scripting language, scripting tags constitute said computer language instructions and said client is a browser program.

6. A method according to claim 1, wherein said first portion does not specify the overall size of the subsequent second response portions.

7. A method according to claim 1, wherein said information fragment in at least one of said second portions is an information fragment relating to a change in said requested information entity, said change being made after said first time instant.

8. A method according to claim 1, wherein, the response, whereof said first portion constitutes a part, is a Hypertext Transfer Protocol Response.

9. A method according to claim 8, wherein said first portion leaves Content-Length field value unknown.

10. A method according to claim 1, wherein said client is a browser program.

11. A method according to claim 1, wherein said script is a scripting language.

12. A method according to claim 11, wherein said scripting language is JavaScript, VBScript or JScript.

13. A method according to claim 11, wherein scripting language tags constitute said computer language instructions.

14. A method according to claim 1, wherein said script is Extensible Markup Language.

15. A method according to claim 14, wherein Extensible Markup Language elements constitute computer language instructions and said information fragments.

16. A method according to claim 15, wherein said first portion comprises starting headers of an Extensible Markup Language document.

17. A system for transferring data from a server to a client using a HTTP connection, said system comprising:
   means for establishing HTTP connections,
   means, for receiving HTTP requests from a client, where only one HTTP request specifying a certain information entity in the server, the HTTP request being according to HTTP protocol and relating to said HTTP connection, after which the client is not required to make another HTTP request to specify said certain information entity in the server, and where said certain information entity is at least partly updated continuously after sending said one HTTP request,
   means for sending as response to the one HTTP request, using a request-specific HTTP connection and at a request-specific first time instant, from the server to the client a first response portion according to said protocol, said first portion comprising a first information fragment relating to said information entity, said first response portion further comprising all HTTP header information of the whole response encompassing said first response portion and subsequent second response portions, and a body of a web page showing a certain information entity, and said client after receipt of said first response portion being arranged to accept further at least one subsequent second response portion,
   means for sending as a response to the one HTTP request, using said request-specific HTTP connection at sequential request-specific second time instants from the server to said client, a plurality of second response portions, each of said second portions comprising only an information fragment of an updated part of said information entity and a script for processing said information fragment of the updated part of said information entity,
   wherein the system is arranged to send the second responses relating to a certain request so that
   the time period between the request-specific first time instant and the earliest request-specific second time instant is at maximum a certain first predetermined time period,
   a time period between two sequential request-specific second time instants is at maximum a certain second predetermined time period, and the HTTP transfer protocol is situated on top of the OSI model in the application layer, and
   means for sending, using said HTTP connection, at sequential third time instants from the server to said client a plurality of third response portions, said third portions containing no information fragments specific to said information entity, wherein at least one of said third portions contains only computer language instructions without the information fragment.

18. A system according to claim 17, further comprising means for sending as a response to the one HTTP request, using said request-specific HTTP connection, at sequential request-specific third time instants from the server to said client a plurality of third response portions, said third portions containing no information fragments specific to said information entity.

19. A system according to claim 18, wherein it is arranged to send the second and third portions relating to the one HTTP request so that
   the time period between the request-specific first time instant and the earliest request-specific second time instant is at maximum a certain first predetermined time period, and
   a time period between two sequential time instants of the request-specific second and third time instants is at maximum a certain second predetermined time period.

20. A system according to claim 17, wherein it resides in a server.

21. A computer readable medium storing a computer program of instructions executable by a computer to control the computer for enabling a system for transferring data from a server to a client using a HTTP connection, the computer program product comprising:
   computer code means for receiving HTTP requests from the client, where only one HTTP request specifying a certain information entity in the server, the HTTP request being according to an HTTP protocol and relating to said HTTP connection, after which the client is not required to make another HTTP request to specify said certain information entity in the server, and where said certain information entity is at least partly updated continuously after sending said one HTTP request,
   computer code means for sending as a response to the one HTTP request, using a request-specific HTTP connection and at a requestspecific first time instant, from the server to the client a first response portion according to said HTTP protocol, said first portion comprising a first information fragment relating to said information entity, said first response portion further comprising all HTTP header information of the whole response encompassing said first response portion and subsequent second response portions, and a body of a web page showing a certain information entity, and said client after receipt of said first response portion being arranged to accept further at least a one subsequent second response portion,
   computer code means for sending as a response to the one HTTP request, using said request-specific HTTP connection at sequential request-specific second time instants from the server to said client, a plurality of second response portions, each of said second portions comprising only an information fragment of updated part of said information entity and script for processing said information fragment of updated part of said information entity,
   wherein the computer program product further comprises computer code means to send the second responses relating to a certain request so that
   i) the time period between the request-specific first time instant and the earliest request-specific second time instant is at maximum a certain first predetermined time period, and
   ii) a time period between two sequential request-specific second time instants is at maximum a certain second predetermined time period, and, the HTTP transfer protocol is situated on top of the OST model in the application layer, and
   computer code means for sending, using said HTTP connection, at sequential third time instants from the server to said client a plurality of third response portions, said third portions containing no information fragments specific to said information entity, wherein at least one of said third portions contains only computer language instructions without the information fragment.

22. A method for transferring data from a server to a client, comprising the steps of:
a) a client sending only one data transfer request to a server, the request being in HTTP data transfer protocol and specifying transfer of a certain information entity located in the server that is to be transferred to the client, where
the one request establishes a HTTP connection between the client and the server,
after sending the one request, the client does not send any further request to the server that specifies said information entity,
said information entity being at least partly updated continuously after sending said one request;
b) the server, using said HTTP connection and the HTTP data transfer protocol, sending to the client a whole response containing the information entity and updates to the information entity,
the whole response is a HTTP response comprising i) a first response portion sent from the server to the client at a first time instant, and ii) plural second response portions sent from the server to the client at subsequent second time instants,
a first time period between an end of the first response portion and a beginning of an initial second response portion being a positive time amount set at maximum to a certain first predetermined time period,
a second time period between an end of one second response portion and a beginning of a next second response portions being a positive time amount set at maximum to a certain second predetermined time period,
the first response portion comprising a first information fragment relating to said information entity, a body of a web page showing said information entity, and all HTTP header information of the whole response encompassing said first response portion and the second response portions,
the second response portions each comprising a further information fragment of an updated part of said information entity and a script for processing said further information fragment of the updated part of said information entity, each second portion being free of any HTTP header information; and
c) the client receiving the first response portion, the first response portion arranging the client to accept the second response portions,
the HTTP data transfer protocol being situated in the application layer on the top of the OSI model.

23. The method of claim 22, wherein,
said client is a browser program,
sending of each second response portion is triggered by the information entity being updated, and
the further information fragment further comprises computer language headers, and
comprising the further steps of:
the server determining whether a update time period has lapsed since the information entity was last updated; and
upon the server determining that the update time period has lapsed, the server, using said HTTP connection and the HTTP data transfer protocol, sends a third response portion to the client,
the third response portion being part of the whole response and being free of any information fragment of said information entity and being free of any HTTP header information,
the third response arranging the client to accept further second response portions,
wherein, after sending the third response portion to the client, the server sends further second response portions to the client, and the client accepts the further second response portions sent after the third response portion.

24. The method of claim 22, wherein,
the first response portion is free of any Content-Length parameter.

25. The method of claim 22, wherein,
the first response portion comprises a Content-Length parameter having a value at least equal to an amount of data contained in the plural second response portions.

26. The method of claim 22, wherein,
the first response portion comprises a Content-Length parameter having a value at least equal to an amount of data contained in the first response portion and the plural second response portions.

27. The method of claim 22, wherein,
the first response portion and the second response portions use a TCP connection as a packet data connection.

28. The method of claim 22, wherein,
the first response portion and the second response portions use a non-TCP connection as a packet data connection.

* * * * *